(12) United States Patent
Nishimura et al.

(10) Patent No.: US 11,965,454 B2
(45) Date of Patent: Apr. 23, 2024

(54) THERMOSTAT DEVICE

(71) Applicant: NIPPON THERMOSTAT CO., LTD., Kiyose (JP)

(72) Inventors: Tetsuya Nishimura, Kiyose (JP); Tatsuya Takahata, Hiroshima (JP); Shinji Watanabe, Hiroshima (JP); Keita Watanabe, Hiroshima (JP); Takayuki Tominaga, Hiroshima (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/274,336

(22) PCT Filed: Feb. 16, 2022

(86) PCT No.: PCT/JP2022/006040
§ 371 (c)(1),
(2) Date: Jul. 26, 2023

(87) PCT Pub. No.: WO2022/176870
PCT Pub. Date: Aug. 25, 2022

(65) Prior Publication Data
US 2024/0093630 A1    Mar. 21, 2024

(30) Foreign Application Priority Data

Feb. 17, 2021  (JP) .................................. 2021-023600

(51) Int. Cl.
*F01P 7/16* (2006.01)
*F16K 31/02* (2006.01)

(52) U.S. Cl.
CPC .............. *F01P 7/16* (2013.01); *F16K 31/025* (2013.01)

(58) Field of Classification Search
CPC ... F01P 7/16; F01P 3/20; F16K 31/002; F16K 11/18; F16K 31/025; F16K 11/065; F16K 27/04
(Continued)

(56) References Cited

U.S. PATENT DOCUMENTS

| 2010/0012738 | A1 | 1/2010 | Park |
| 2011/0233287 | A1 | 9/2011 | Park et al. |
| 2011/0297365 | A1 | 12/2011 | Hamaguchi |

FOREIGN PATENT DOCUMENTS

| DE | 202011001955 U1 | * | 1/2012 | ............... A62C 4/02 |
| JP | 2008255852 A | * | 10/2008 | |

(Continued)

OTHER PUBLICATIONS

PCT/ISA/210, "International Search Report for PCT International Application No. PCT/JP2022/006040," dated Mar. 22, 2022.

*Primary Examiner* — George C Jin
*Assistant Examiner* — Teuta B Holbrook
(74) *Attorney, Agent, or Firm* — Manabu Kanesaka

(57) ABSTRACT

A thermostat device ensures a coolant amount from a bypass passage sufficiently and excellent temperature sensitivity to the coolant temperature. The thermo-operating unit is provided with a control valve for controlling an introduced coolant amount from a first flow inlet via a radiator, corresponding to the temperature of the coolant from a second flow inlet via a bypass passage. Within the housing are provided multiple guides, which are formed extending from the second flow inlet side toward a thermo-element, are arranged intermittently around the thermo-element, and support the thermo-element slidably movable in an axial direction and coolant rectifying protrusions arranged spaced apart from the thermo-element between the guides, wherein a detoured passage for the coolant, directed from the second (Continued)

flow inlet side toward an outflow port, is formed by forming gaps between the guides and the coolant rectifying protrusions.

4 Claims, 8 Drawing Sheets

(58) Field of Classification Search
USPC ..... 236/34.5, 93 R, 101 C; 123/41.08, 41.12
See application file for complete search history.

(56) References Cited

FOREIGN PATENT DOCUMENTS

| | | | | |
|---|---|---|---|---|
| JP | 2011-208532 A | 10/2011 | | |
| JP | 2012-026341 A | 2/2012 | | |
| JP | 6002580 B2 * | 10/2016 | ............. | F01P 7/167 |
| KR | 101018538 B1 * | 3/2011 | | |
| WO | 2007/108273 A1 | 9/2007 | | |
| WO | 2009/028539 A1 | 3/2009 | | |
| WO | WO-2013114676 A1 * | 8/2013 | ................ | F01P 7/16 |
| WO | WO-2018097811 A1 * | 5/2018 | ................ | F01P 7/16 |

\* cited by examiner

THERMOSTAT DEVICE

TECHNICAL FIELD

The present invention relates to a thermostat device disposed in the middle of a circulation flow passage through which a coolant is circulated between an internal combustion engine (hereinafter also referred to as an engine) and the radiator mounted on automobiles, for example, to control the coolant temperature appropriately.

BACKGROUND ART

The thermostat device is provided with a thermo-element incorporating a thermal expansion body (wax) expanding and contracting by sensing a temperature change in the coolant flowing through the circulation flow passage between the engine and the radiator and functions to maintain the coolant to a predetermined temperature by opening and closing the control valve (valve body) by volume change caused by expansion and contraction of the thermal expansion body.

Namely, a thermo-operating unit, including a thermo-element incorporating a thermal expansion body and a control valve, is accommodated in a housing and, for example, disposed at the inlet of the coolant passage of the engine. The thermo-operating unit closes the valve when the coolant temperature is low, and the coolant is circulated through the bypass passage without passing through the radiator.

Further, the thermo-operating unit opens the valve to have the coolant circulate through the radiator when the coolant temperature increases. With this, the thermo-operating unit operates to control the temperature of the coolant through the water jacket, which is the coolant passage in the engine, to a proper state.

Therefore, for a thermostat device of this type, improving the temperature sensitivity capable of immediately responding to the coolant temperature from the engine and controlling open and close of a control valve is required. A thermostat device disclosed in patent literature 1 (PTL 1) is an example thereof.

The thermostat device illustrated in PTL 1 is shown in FIG. 13. The thermostat 11 is constituted by accommodating the thermo-operating unit 15 in a housing 12 composed of a case 13 and an inlet 14.

A flow inlet 14a of the coolant from the radiator side is formed on the inlet 14 side, constituting the housing 12. In the case 13 side, constituting the housing 12 similarly, a flow inlet 13a of the coolant from the bypass passage bypassing the radiator and a flow inlet 13b of the coolant through the heater core as a heat exchanger for cabin heating are formed. The coolant from respective flow inlets 13a, 13b, and 14a are mixed in the housing 12 and delivered toward the water jacket of the engine through the flow outlet 13c of the coolant.

The thermo-operating unit 15 includes a thermo-element (temperature sensing unit) 15a incorporating a thermally expanding body (wax) responding to the coolant temperature, a piston 15b extending and retracting by the action of the thermally expanding body, a disc-shaped control valve (valve body) 15c attached to the thermo-element 15a, a spring member 15d biasing the control valve 15c to abut on the inlet 14 side to be into the closed-valve state.

The tip end of the piston 15b is engaged with a shaft supporting part 14b formed in the inlet 14. The valve opening state of the control valve 15c is controlled depending on the coolant temperature applied to the thermo-element 15a. Thus, the thermo-operating unit 15 operates to keep the coolant temperature applied to the engine to be appropriate by adjusting the flow-in amount of the coolant from the radiator side in particular.

Further, in the thermostat device 11 disclosed in PTL 1, a cylindrical member 16 surrounding the cylindrical thermo-element 15a and having a predetermined gap to the thermo-element 15a is disposed, attached inside the case 13. With the cylindrical member 16, the coolant from the bypass passage is configured to flow along the circumference of the thermo-element 15a. It is recited that in this configuration the thermo-element 15a controls the valve-opening state of the control valve 15 depending on the coolant temperature from the bypass passage, and a thermostat device having an excellent temperature sensitivity corresponding to the coolant temperature from the engine can be provided.

CITATION LIST

Patent Literature

PTL 1: WO2007-108273

SUMMARY OF INVENTION

Technical Problem

In the thermostat device 11 disclosed in PTL 1, the coolant from the bypass passage is directed toward the flow outlet 13c side of the coolant through the gap between the thermo-element 15a and the cylindrical member 16.

Thus, there is a technical problem that it is difficult to ensure the flow amount when the flow amount from the bypass passage bypassing the radiator increases due to the squeeze of the flow of the coolant in the gap between the thermo-element 15a and the cylindrical member 16.

The present invention is made considering the technical problems of conventional thermostat devices, and it is a main task to provide a thermostat device that can ensure a sufficient flow amount of coolant from the bypass passage and also have an excellent temperature sensitivity corresponding to the temperature of the coolant from the engine.

Solution to Problem

A thermostat device according to the present invention made in order to solve the above-described problems includes, as recited in claim 1, a housing provided with
  a first flow inlet to introduce a coolant that is cooled by a radiator,
  a second flow inlet to introduce a heated coolant by an internal combustion engine not passing through the radiator, and
  a flow outlet of the coolant to deliver the coolant to the internal combustion engine which is a mixture of respective coolants from the first flow inlet and the second flow inlet;
a thermo-element accommodated in the housing and axially movable depending on the temperature of the coolant from the second flow inlet;
a control valve that controls the introduced amount of the coolant from the first flow inlet upon the movement of the thermo-element;
multiple guides formed to extend toward the thermo-element from the second flow inlet side and disposed intermittently along the circumference of the thermo-element, supporting the thermo-element axially movably;

coolant rectifying protrusions arrayed with a gap from the thermo-element at the positions avoiding the guides on the circumference of the thermo-element; and detoured passages of the coolant directing from the second flow inlet side to the flow outlet side, formed between the adjacent guides and the coolant rectifying protrusions, between the guides, or between the coolant rectifying protrusions.

According to the invention as recited in claim 1, at the second flow inlet side for introducing coolant heated at the internal combustion engine but not passing through the radiator, multiple guides are intermittently disposed along the circumference of the thermo-element constituting the thermo-operating unit, and the thermo-element is supported by the guides movably in the axial direction. This structure allows the thermo-element to move smoothly along the axial direction and ensures the reliability of the operation of the thermo-operating unit.

Further, the coolant rectifying protrusions are formed with space apart from the thermo-element between the guides supporting the thermo-element. The coolant rectifying protrusions allow part of the coolant from the second flow inlet to flow along the thermo-element between the coolant rectifying protrusions and the thermo-element. Therefore, the thermo-element efficiently reacts to the coolant temperature from the second flow inlet and performs open-close control of the control valve, and contributes to improving the temperature sensitivity of the thermo-operating unit.

Further, since a detoured passage for coolant flowing from the second flow inlet side to the flow outlet is formed by forming gaps between the guides and coolant rectifying protrusions, both arrayed along the periphery, between guides, and between the coolant rectifying protrusions, the amount of coolant from the second flow inlet is the sum of coolant flowing in the detoured passage formed by the gaps and the amount of coolant flowing between the thermo-element and the coolant rectifying protrusions. This structure can provide a thermostat device that can sufficiently ensure the amount of coolant from the second flow inlet.

Further, in the preferable embodiment of the thermostat device according to the present invention, as recited in claim 2, the thermo-element is formed to be cylindrical, disposed in a state where the guides are slidably in contact with the side face of the thermo-element at least at three positions along the circumference of the thermo-element, and in addition, the length of the respective guides along the axial direction of the thermo-element is formed longer than the length of the coolant rectifying protrusions.

According to the invention recited in claim 2, the length of the respective guides along the axial direction of the thermo-element is formed longer than the length of the coolant rectifying protrusions, whereby the guides can cover the movement range of the lower bottom side of the thermo-element.

Thus, the guides effectively prevent the radial run-out particularly near the lower bottom portion of the thermo-element moving in the axial direction, whereby a smooth motion along the axial direction of the thermo-element can be achieved.

In contrast, in the thermostat device according to the present invention, as recited in claim 3, the end portion of each guide of the second flow inlet side is located closer to the second flow inlet side than the coolant rectifying protrusions, and a coolant passage from the second flow inlet side to the flow outlet is preferably formed between the respective guides in a state where the thermo-element moves most to the second flow inlet side.

According to the invention recited in claim 3, a coolant passage from the second flow inlet side to the flow outlet is formed between the respective guides in a state where the thermo-element moves most to the second flow inlet side.

Since the passage allows a low flow rate of coolant to flow from the second flow inlet side to the flow outlet even in the case the thermo-element moves lower than the case inner bottom to open the control valve widely, the supply amount of coolant to the engine is secured.

Further, in the thermostat device according to the present invention, in addition to the above construction, as recited in claim 4, the coolant rectifying protrusions are disposed along the axial direction of the thermo-element.

According to the invention recited in claim 4, since the coolant rectifying protrusions are arrayed along the axial direction of the thermo-element, the coolant rectifying protrusions make the coolant flow along the longitudinal direction of the coolant rectifying protrusions and provide effects to bring the coolant into effective contact with the thermo-element.

This can provide a thermostat device with excellent temperature sensitivity corresponding to the coolant temperature.

Advantageous Effects of Invention

According to the present invention, a thermostat device ensuring a sufficient amount of coolant from the bypass passage and also having an excellent temperature sensitivity corresponding to the temperature of the coolant from the engine can be provided.

DESCRIPTION OF EMBODIMENTS

A thermostat device according to the present invention will be described based on embodiments illustrated in drawings. FIGS. 1 through 5 show the entire configuration of the thermostat device. The thermostat device 1 is disposed in a circulation passage for circulating the coolant between the engine and the radiator and is constituted by accommodating the thermo-operating unit 2 which controls the temperature of the coolant to be supplied to the engine in the housing 3.

That is, the thermostat device 1 is disposed at a crossing section of a coolant passage from the radiator side and a bypass passage for coolant from an outlet side of the engine not passing through the radiator. The thermostat device 1 operates to appropriately control the temperature of the coolant toward an inlet of the engine by mixing a coolant that is cooled at the radiator and a coolant from the bypass passage heated at the engine.

Figure 1:
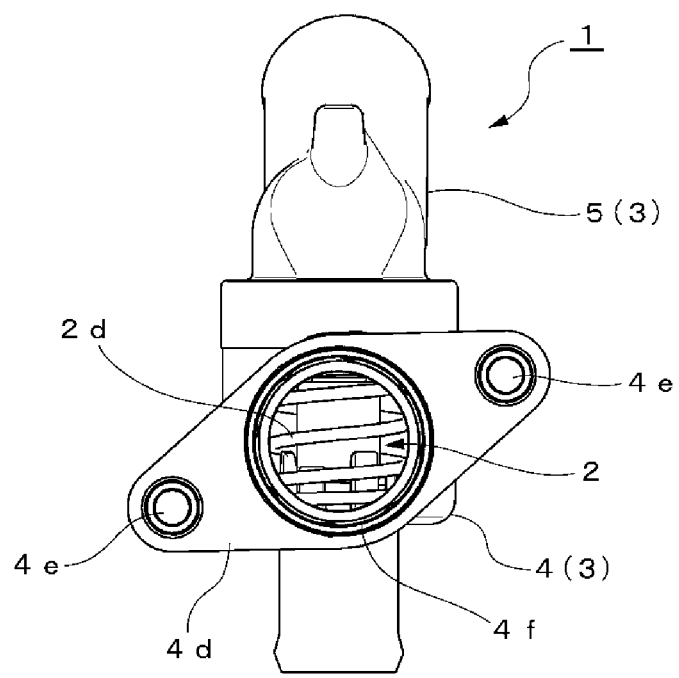
FIG. 1 is a front view showing the entire configuration of a thermostat device according to the present invention.
Figure 2:
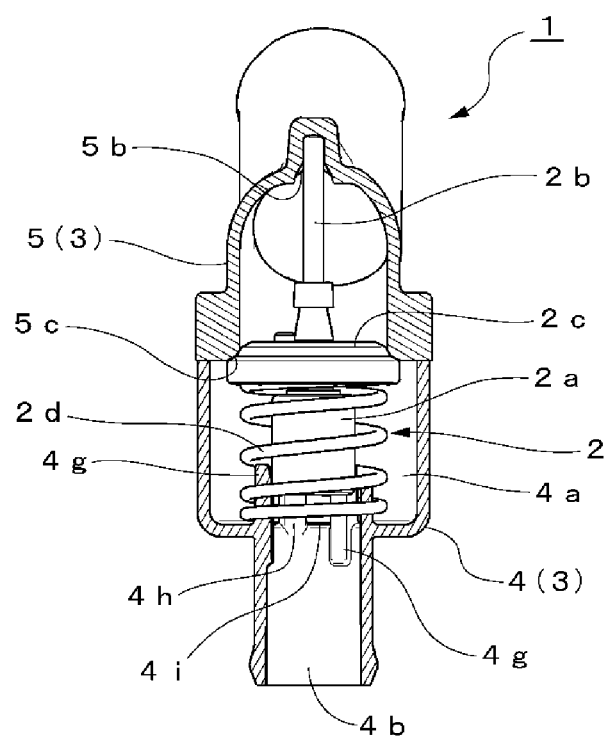
FIG. 2 is a partial cross-sectional view shown by cutting away the front half of a housing shown in FIG. 1.

For the convenience of description, the upper portion and the lower portion in FIG. 1 are simply referred to as "the upper" and "the lower" from now. In the embodiment, the housing 3 constituting an outer frame of the thermostat device 1 is composed of a case 4 and an inlet 5 joined and attached to the top of the case 4, both molded of a resin material.

The inlet 5 is provided with a first flow inlet 5a having a cylindrical shape for receiving the coolant from the radiator side; the first flow inlet 5a is formed in a state of being bent by about 60 degrees (See FIG. 3) with respect to the axis of movement of the thermo-operating unit 2 described later.

A unit housing space 4a of the thermo-operating unit 2 is formed in the center part of the case 4, and a cylindrical second flow inlet 4b is formed directing downward from the unit housing space 4a, and the coolant from the bypass passage is introduced to the second flow inlet 4b.

Figure 3:
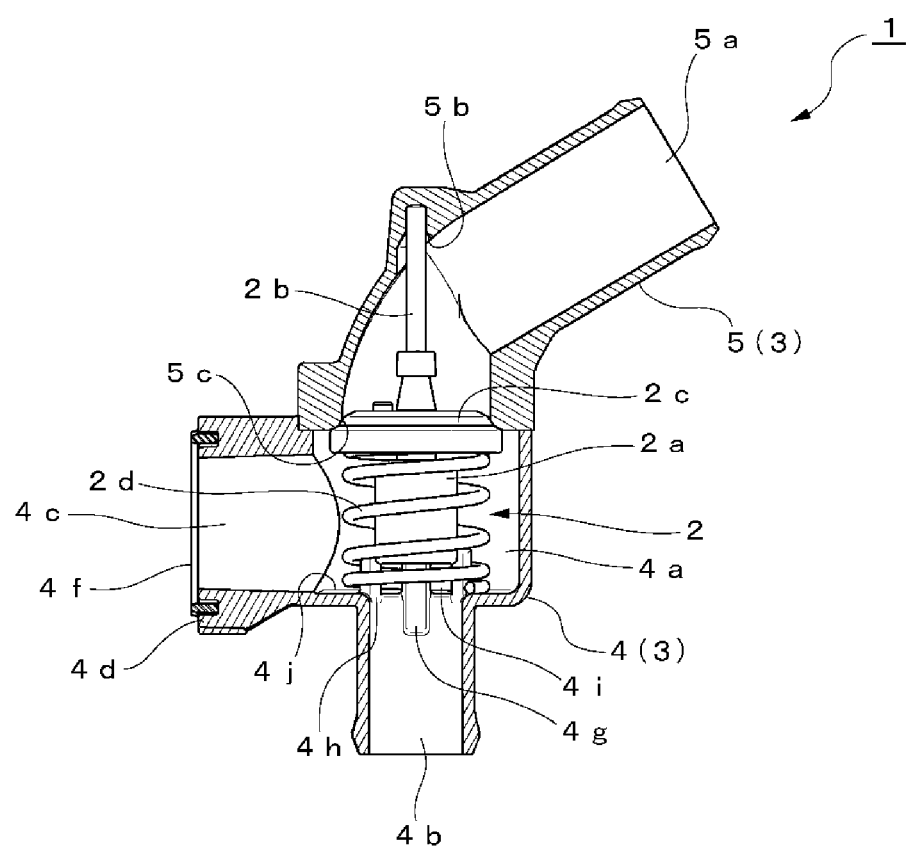
FIG. 3 is a partial cross-sectional view shown by cutting away the right half of the housing, viewed from the cutting side.
Figure 4:
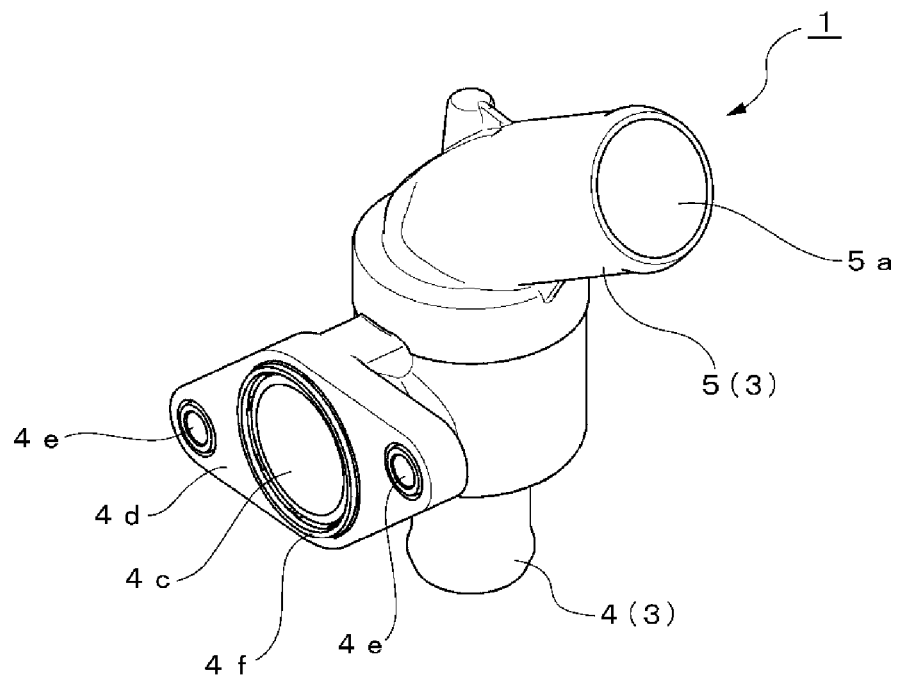
FIG. 4 is a perspective view showing the entire configuration of the thermostat device.
Figure 5:
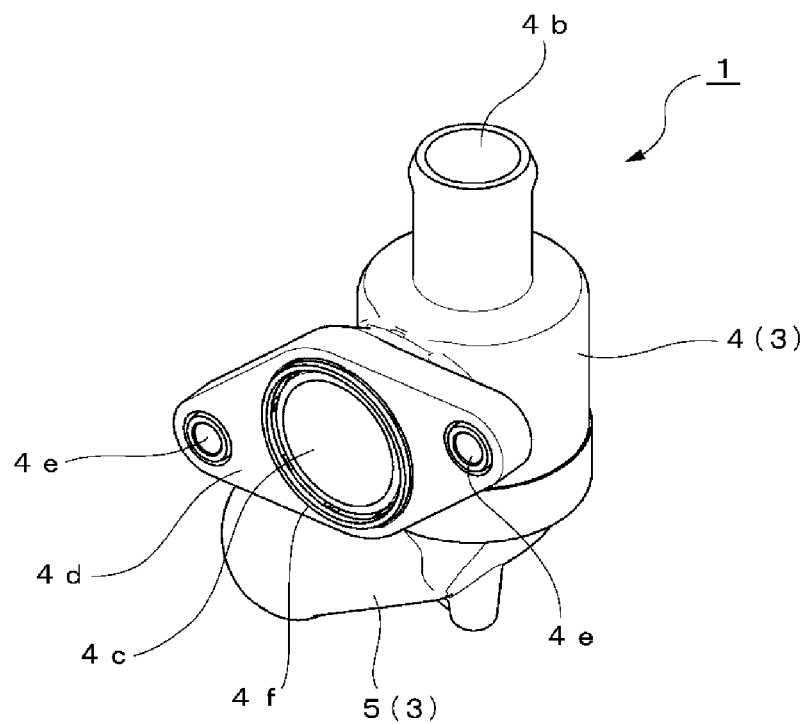
FIG. 5 is a perspective view showing the top-bottom inverted from the state shown in FIG. 4.

Further, in the case 4, a flow outlet 4c of the coolant for supplying the coolant to the engine side is formed toward the direction orthogonal to the axis of movement of the thermo-operating unit 2, and the flow outlet 4c of the coolant is formed toward the opposite side to the bending direction of the first flow inlet 5a formed in the inlet 5 (See FIG. 3.)

The flow outlet 4c of the coolant is constituted enabling it to be disposed on the upstream side of the water pump for delivering the coolant to the engine; for this purpose, a flange 4d for directly connecting the thermostat device 1 to the water pump (not shown) side and bolt insertion holes 4e (See FIGS. 4 and 5) for fastening bolts at positions opposite to each other by 180 degrees are provided on the flange 4d. In addition, an annular-shaped packing 4f for joining to the water pump side is attached along the opening so as to surround the flow outlet 4c of the coolant.

The thermo-operating unit 2 accommodated in the unit housing space 4a of the housing 3 is provided with a cylinder-shaped thermo-element (temperature sensing unit) 2a incorporating a thermal expansion body (wax) that expands and contracts depending on the coolant temperature; the piston 2b disposed along the axis of the thermo-element 2a operates to advance and retract from the thermo-element 2a due to the expansion and contraction of the thermal expansion body.

The tip portion of the piston 2b is fitted to a shaft support 5b formed at the central upper portion inside the inlet 5 constituting the housing 3 and attached to the housing 3.

Accordingly, the cylinder-shaped thermo-element 2a operates to move along the axial direction in the unit housing space 4a as the piston 2b extends and retracts.

A disc-shaped control valve (valve body) 2c is attached to the upper portion of the thermo-element 2a, and the control valve 2c creates a valve-closed state by abutting on an annular valve seat 5c formed at the lower opening of the inlet 5. A spring member 2d is disposed surrounding the thermo-element 2a so as to be in contact with the control valve 2c at one end thereof, and, in the case 4, the other end of the spring member 2d abuts the case inner bottom 4j of the case 4 so as to surround the guides 4g intermittently annularly arrayed and the coolant rectifying protrusions 4h (See FIGS. 6 and 7).

Accordingly, the spring member 2d applies a biasing force so as to press the disc-shaped control valve 2c to the annular valve seat 5c formed in the inlet 5.

Figure 6:
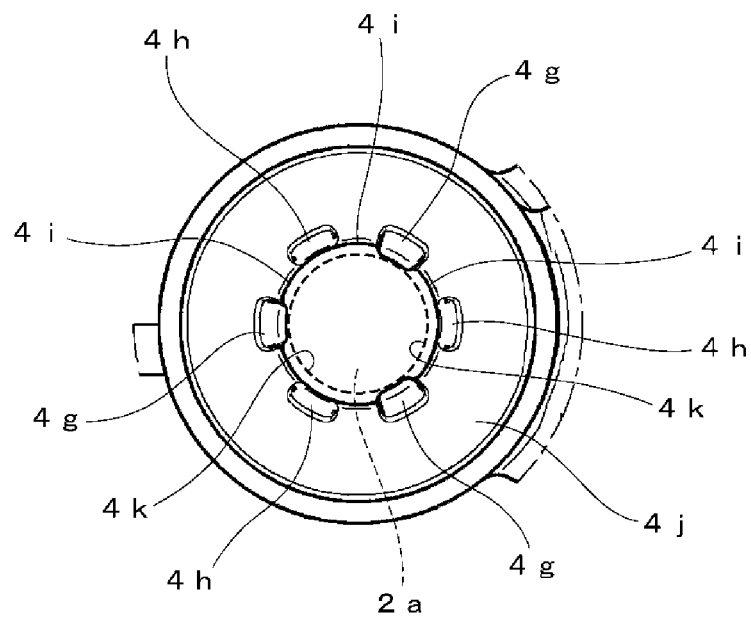
FIG. 6 is a plan view of the thermostat device viewed from the center of the housing toward the second flow inlet side.
Figure 7:
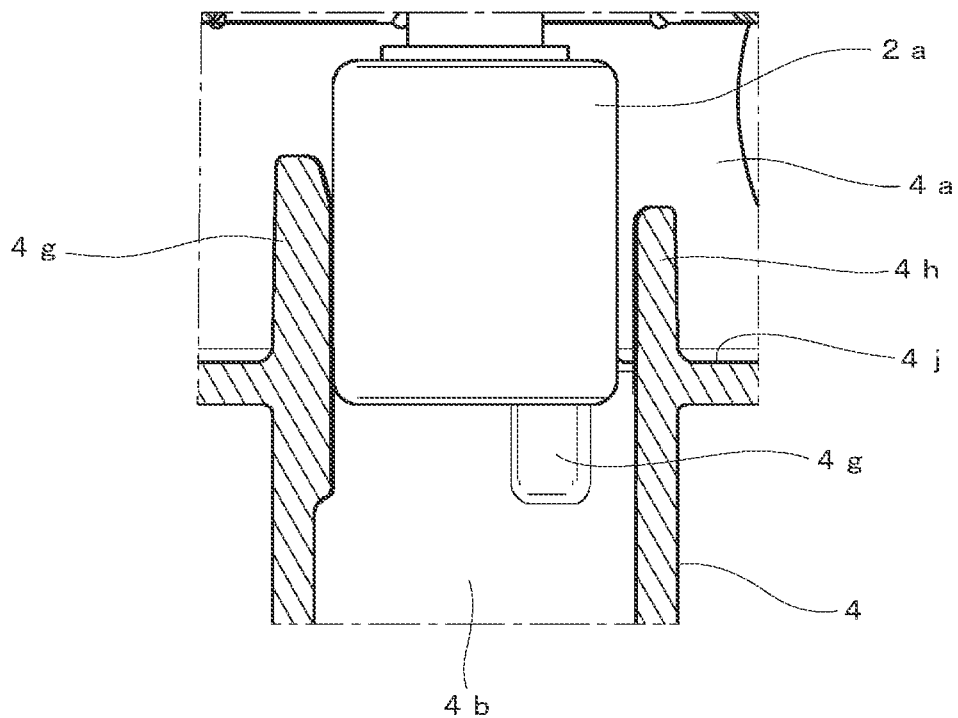
FIG. 7 is a partially enlarged view illustrating the relation between the second flow inlet and the thermo-element.

The guides 4g and the coolant rectifying protrusions 4h, also shown in FIGS. 6 and 7, are formed to respectively rise from the second flow inlet 4b side of the case 4 toward the unit housing space 4a.

Of these, the guides 4g are formed to extend from the second flow inlet 4b side toward the thermo-element 2a and, in this embodiment, are arrayed at an interval of 120 degrees along the periphery of the thermo-element 2a. That is, the axially-long inscribed surfaces of the three guides 4g are in sliding contact with the side surface of the thermo-element 2a and function to support the thermo-element 2a movably in the axial direction.

The upper end of the guides 4g locates at a higher position than the upper end of the coolant rectifying protrusions 4h. Further, the guides 4g are formed to cover the range of movement of the lower bottom part side of the thermo-element 2a so as to further reach the second flow inlet 4b side than the case inner bottom 4j, as shown in FIG. 7.

Because of this, the length of the guides 4g along the axial direction of the thermo-element 2a is formed longer than the length of the coolant rectifying protrusions 4h.

The guides 4g effectively prevent the radial run-out particularly near the lower bottom portion of the thermo-element 2a moving in the axial direction, whereby a smooth motion along the axial direction of the thermo-element 2a can be achieved.

The coolant rectifying protrusions 4h are arranged at equal intervals in the circumferential direction between each of the three guides 4g. That is, the three coolant rectifying protrusions 4h rise from the case inner bottom 4j as shown in FIG. 7, and the upper end thereof is formed to locate at a position slightly lower than the upper end of the guide 4g.

The coolant rectifying protrusions 4h are disposed with a predetermined gap with respect to the side surface of the thermo-element 2a. It is desirable that the gap between the side surface of the thermo-element 2a and the coolant rectifying protrusions 4h is set to be 1 mm or wider.

Each coolant rectifying protrusion 4h provides the action of effectively bringing the flow of coolant from the second flow inlet 4b into contact with the thermo-element 2a along the longitudinal direction of the coolant rectifying protrusions 4h.

A gap 4i is formed at the upper position of the case inner bottom 4j of the case 4 between the guides 4g and the coolant rectifying protrusions 4h, as shown in FIGS. 3 and 6. The gap 4i functions as a detoured passage (indicated by the same reference sign 4i) of the coolant from the second flow inlet 4b side toward the flow outlet 4c of the coolant.

The functions and the effects of this coolant detoured passage 4i will be described later.

The end portion of the second flow inlet 4b side of each guide 4g locates at a closer position to the second flow inlet 4b than the coolant rectifying protrusion 4h as shown in FIG. 7. In a state where the valve opening of the control valve 2c increases to cause the thermo-element 2a to move below the case inner bottom 4j, an arc-shaped flow passage 4k with the thermo-element 2a as an inner circumferential surface is formed between each guide 4g, as shown in FIG. 6.

The arc-shaped flow passage 4k allows a low flow rate of coolant to flow from the second flow inlet 4b side toward the flow outlet 4c of the coolant even when the control valve 2c opens widely by the movement of the thermo-element 2a downward below the case inner bottom 4j, whereby the supply amount of coolant to the engine can be secured.

Figure 8:
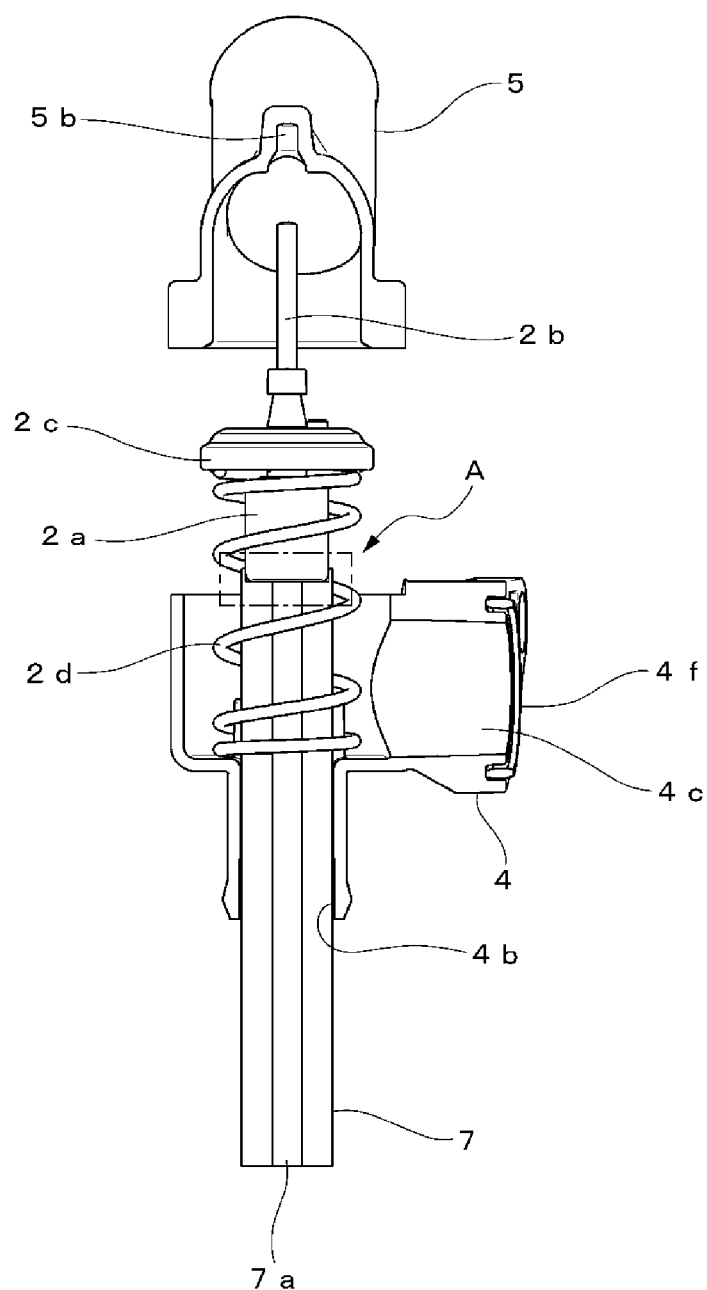
FIG. 8 is a schematic view of the thermostat device in the process of assembly.
Figure 9:
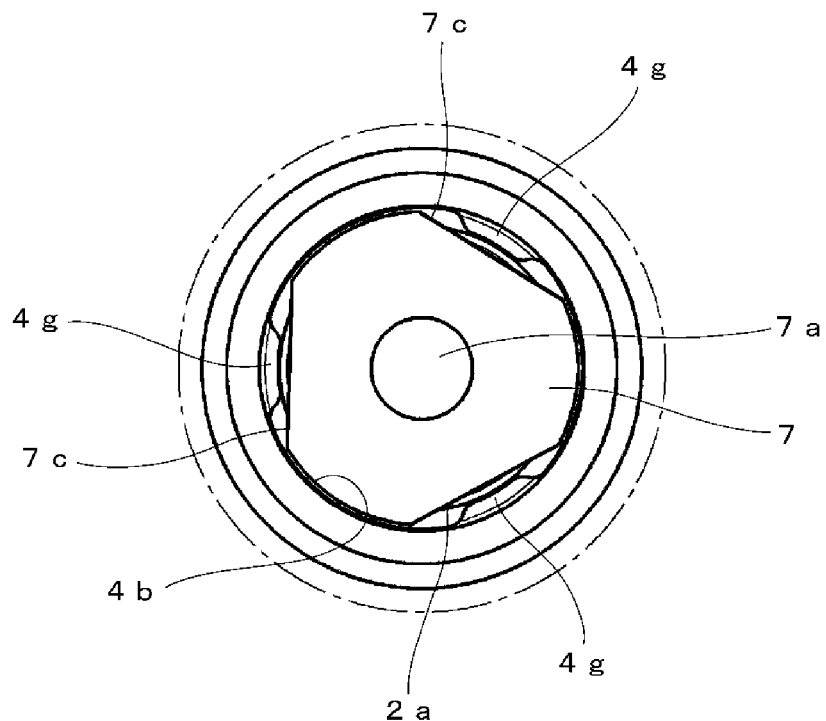
FIG. 9 is a partially enlarged view of the thermostat device viewed from an assembly jig side shown in FIG. 8.
Figure 10:
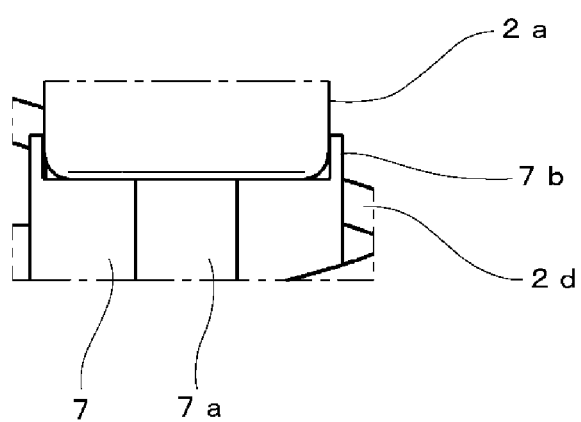
FIG. 10 is an enlarged view of part A in the schematic view shown in FIG. 8.

FIGS. 8 through 10 show the assembly procedure of the thermostat device 1. At the time of assembly of the thermostat device 1, a supporting member of the thermo-element formed columnar is prepared as an assembly jig 7.

The assembly jig 7 is constructed based on an equilateral triangular prism having a configuration in which the ridges forming the three interior angles of an equilateral triangular prism are each formed into an arc shape; the shape viewed from the lowest end side of the longitudinal direction is illustrated in FIG. 9. Each surface formed arc-shaped is formed to have a dimension to inscribe with the second flow inlet 4b of the case 4 and the coolant rectifying protrusion 4h, as shown in FIG. 8.

In addition, the assembly jig 7 has an axial bore 7a along the axis, and, on the upper end thereof, a small protrusion 7b protruding from the arc-shaped end face is formed, as shown in the partially enlarged view in FIG. 10 (corresponding to the A-portion in FIG. 8). The arc-shaped small protrusion 7b, with inscribing with the bottom circumferential surface of the thermo-element 2a, is configured such that the thermo-element 2a can be placed on the upper end of the assembly jig 7.

The assembly jig 7 formed in columnar is inserted from the second flow inlet 4b side of the case 4, as shown in FIG. 8. At this time, as shown in FIG. 9, the assembly jig 7 is inserted from the second flow inlet 4b such that the face 7c of the triangular prism of the assembly jig 7 is positioned at the guides 4g formed in the case 4; that is, the arc-shaped face of the assembly jig 7 may not come in to contact with the guides 4g. Subsequently, the spring member 2d is attached along the periphery of the assembly jig 7 protruding upward from the case 4.

By placing the thermo-element 2a, to which the control valve 2c is attached in advance, on the top of the spring member 2d and pressing it along the axial direction, the bottom portion of the thermo-element 2a is axially aligned with the assembly jig 7 using the small protrusion 7b as the guide as shown in FIG. 10 and brought into contact with the upper end of the assembly jig 7. Then, the thermo-element 2a is adsorbed to the upper end of the assembly jig 7 and temporally fixed, by applying negative pressure through the axial bore 7a of the assembly jig 7.

The tip portion of the piston 2b formed in the thermo-element 2a is inserted into the shaft support 5b of the inlet 5 in a state where the thermo-element 2a is temporally fixed on the upper-end face of the assembly jig 7.

In the above state, the thermo-element 2a is accommodated in the central portion of annularly arrayed guides 4g and the coolant rectifying protrusions 4h by pulling out the assembly jig 7 from the second flow inlet 4b while pressing the inlet 5 to the case 4 side.

At last, the assembly of the thermostat device 1 is completed by joining the inlet 5 on the case 4.

According to the assembly means for the thermostat device 1 using the assembly jig 7, described based on FIGS. 8 to 10, by inserting the assembly jig 7 into the second flow inlet 4b and mounting the thermo-element 2a on the assembly jig 7, the thermo-element 2a can be pulled into the inside of the guides 4g and the coolant rectifying protrusions 4h in a state where the thermo-element 2a is put centered by aligning the center of the thermo-element 2a with the center of the annularly arrayed guides 4g and the coolant rectifying protrusions 4h which are disposed surrounding the second flow inlet 4b.

With this, the thermo-element 2a can be surely inserted inside the guides 4g and the coolant rectifying protrusions 4h without tilting the spring member 2d during assembly.

Thus, since the thermo-element 2a can be surely inserted inside the guides 4g and the coolant rectifying protrusions 4h while preventing the spring member 2d from tilting, it is possible to assemble the thermostat device 1 by an automatic machine.

The assembly procedure of the thermostat device 1 is not limited to this, but can be appropriately changeable. For example, the thermostat device 1 can be assembled manually. In such a case, the shape of the conduit on the bypass passage side, where the second inlet 4b is formed, may be straight, as shown in the drawings, or even if it is L-shaped or any other shape, the thermostat device 1 can be assembled.

That is, the shape of the conduit on the bypass passage side, where the second flow inlet 4b is formed, may be straight, L-shaped, or in any other shape.

According to the thermostat device 1 thus constituted above, the coolant supplied to the second flow inlet 4b from the bypass passage side is supplied to the unit housing space 4a of the housing 3 where the thermo-element 2a is located therein. When the temperature of the coolant from the bypass passage side rises there, the expansion body incorporated in the thermo-element 2a expands and the piston 2b extends (protrudes).

This movement causes the control valve 2c attached to the thermo-element 2a to retract toward the second flow inlet 4b side to open the valve, resisting the biasing force of the spring member 2d, and the coolant having passed through the radiator from the first flow inlet 5a is supplied.

Accordingly, the coolant from the first flow inlet 5a and the coolant from the second flow inlet 4b are mixed in the vicinity of the unit housing space 4a, and the mixture is delivered to the water jacket of the engine from the flow outlet 4c of the coolant. This allows the temperature of the coolant through the engine water jacket to be controlled to a proper state.

Further, as shown in FIGS. 6 and 7, in the thermostat device 1 described above, the thermo-element 2a is supported movably in the axial direction by the three guides 4g disposed at an equal distance along the periphery of the thermo-element 2a. This allows the thermo-element 2a to move along the axial direction smoothly and ensures the reliability of the operation of the thermo-operating unit 2.

In addition, in the embodiment, three coolant rectifying protrusions 4h allowing the coolant supplied to the second flow inlet 4b through the bypass passage to flow along the thermo-element 2a are disposed between the guides 4g. This allows part of the coolant from the second flow inlet 4b to flow along the longitudinal direction of the coolant rectifying protrusions 4h, as indicated by an arrow extending toward B direction in FIG. 11.

As a result, the thermo-element 2a efficiently reacts to the coolant temperature from the second flow inlet 4b and allows to control opening and closing of the control valve 2c, thereby contributing to the improvement of the temperature sensitivity of the thermo-operating unit 2.

Figure 12:
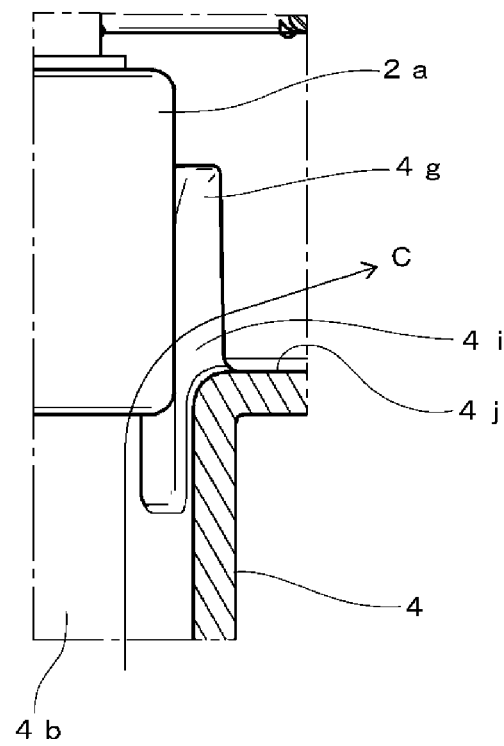
FIG. 12 is a partially enlarged view of the flow of the coolant due to coolant rectifying protrusions.
Figure 13:
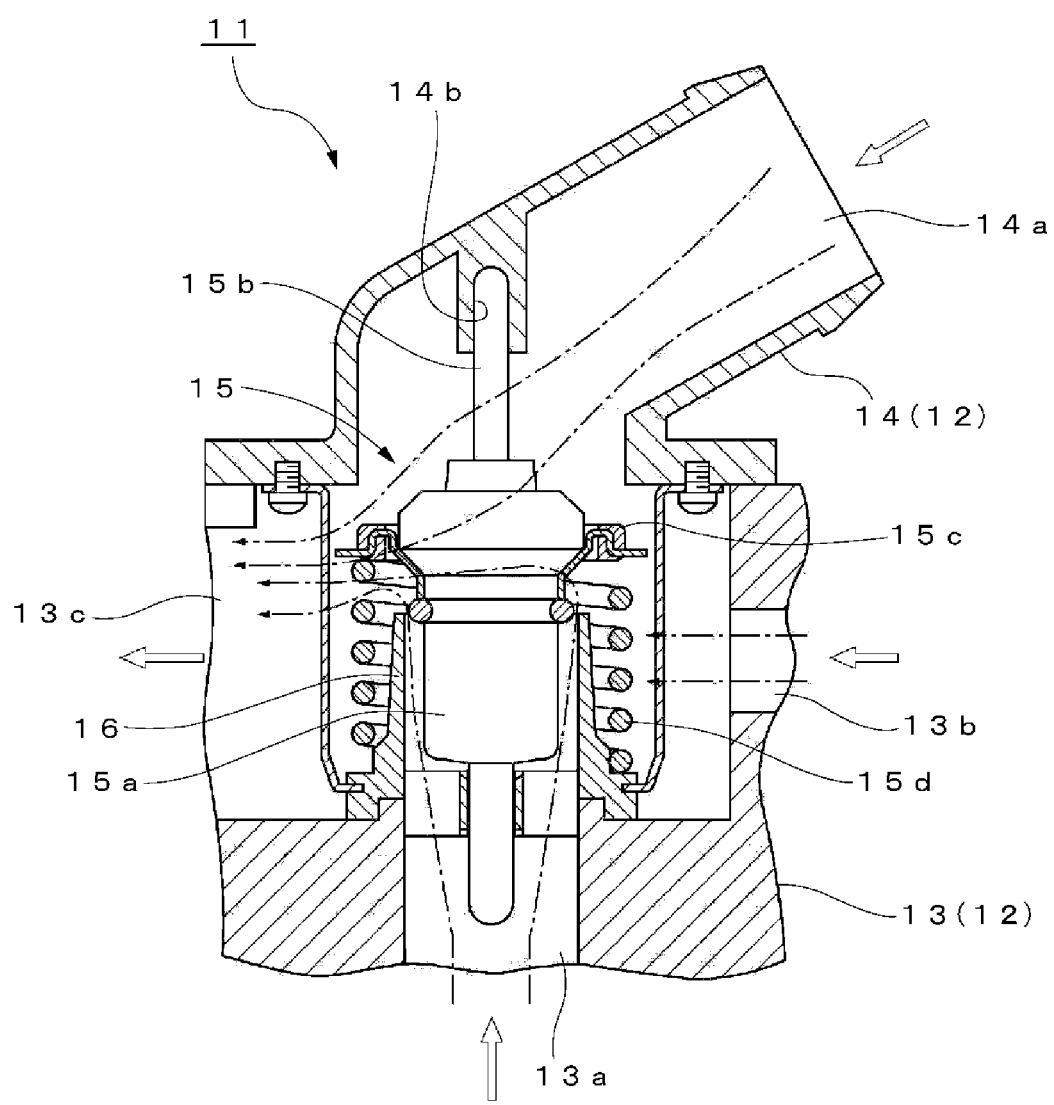
FIG. 13 is a cross-sectional view of an example of a conventional thermostat device.

Further, in the embodiment, since between the guides 4g and the coolant rectifying protrusions 4h, both arrayed along the periphery of the thermo-element 2a, a gap 4i is formed to form a detoured passage 4i for the coolant toward the flow outlet 4c from the second flow inlet 4b, the coolant from the second flow inlet 4b is allowed to flow efficiently through the detoured passage 4i formed by the gap, as indicated by an arrow extending to C direction in FIG. 12.

Figure 11:
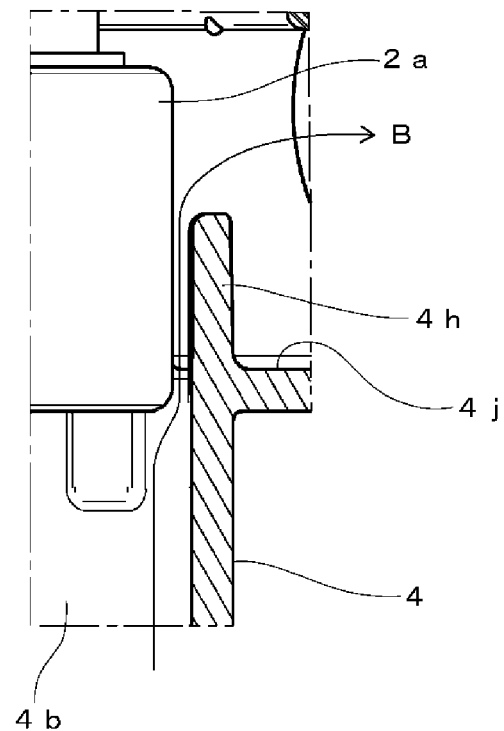
FIG. 11 is a partially enlarged view of coolant flow passing through the detoured passage of the coolant.

Accordingly, in the coolant from the second flow inlet 4b, the flow indicated by arrow C in FIG. 12 is added to the flow indicated by arrow B in FIG. 11, thereby providing the thermostat device 1 capable of ensuring the coolant flow amount through the bypass passage sufficiently.

In the embodiment described above, three guides 4g are provided at an equal interval along the circumferential direction; four or more guides can be provided as needed and may also be provided at unequal intervals along the circumferential direction.

Further, one coolant rectifying protrusion 4h is each disposed between the respective guides 4g, but two or more coolant rectifying protrusions may be disposed; the number thereof may be set optionally depending on the positions of the flow outlet 4c of the coolant.

Accordingly, the gap 4i constituting the detoured passage of the coolant may be formed between adjacent guide 4g and the coolant rectifying protrusion 4h, between the guides 4g or between the coolant rectifying protrusions 4h, depending on the arrangement of the guides 4g and the coolant rectifying protrusions 4h.

INDUSTRIAL APPLICABILITY

As described above, the thermostat device according to the present invention is useful as a device for supplying coolant to an engine of an automobile and is particularly suitable for use in controlling the temperature of coolant supplied to the engine to a proper state.

REFERENCE SIGNS LIST

1 Thermostat device
2 thermo-operating unit
2a thermo-element
2b piston
2c control valve (valve body)
2d spring member
3 housing
4 case
4a unit housing space
4b second flow inlet
4c flow outlet
4d flange
4e bolt insertion hole
4f packing
4g guide
4h coolant rectifying protrusion
4i gap (detoured passage)
4j case inner bottom
4k flow passage
5 inlet
5a first flow inlet
5b shaft support
5c valve seat

The invention claimed is:

1. A thermostat device comprising:
a housing comprising
   a first flow inlet for introducing coolant cooled by a radiator,
   a second flow inlet for introducing coolant, not passing through the radiator, heated in an internal combustion engine, and
   a flow outlet of the coolant for delivering the mixed coolant of the coolant from the first flow inlet and the second flow inlet to the internal combustion engine;
a thermo-element accommodated in the housing, moving in an axial direction depending on the temperature of the coolant from the second flow inlet;
a control valve controlling an introduced coolant amount from the first flow inlet in conjunction with the movement of the thermo-element;
multiple guides formed to extend from the second flow inlet side toward the thermo-element, and intermittently disposed along a circumference of the thermo-element, and movably supporting the thermo-element in the axial direction;
coolant rectifying protrusions disposed with a gap from the thermo-element at a position avoiding the guides on the circumference of the thermo-element; and
a detoured passage of the coolant directing from the second flow inlet side formed between the adjacent guide and the coolant rectifying protrusion, or between guides, or between the coolant rectifying protrusions to the flow outlet.

2. The thermostat device recited in claim 1, wherein the thermo-element is formed to be cylindrical, disposed in a state where the guides are in slide contact with the side face of the thermo-element at least at three positions along the circumference of the thermo-element, and in addition, the length of the respective guides along the axial direction of the thermo-element is formed longer than the length of the coolant rectifying protrusions.

3. The thermostat device recited in claim 1, wherein the end portion of the second flow inlet side of each guide of the second flow inlet side is located closer to the second flow inlet side than the coolant rectifying protrusions, and a coolant passage from the second flow inlet side to the flow outlet is formed between the respective guides in a state where the thermo-element moves most to the second flow inlet side.

4. The thermostat device recited in claim 1, wherein the coolant rectifying protrusions are disposed along the axial direction of the thermo-element.

* * * * *